United States Patent [19]
Garback

[11] Patent Number: 5,237,499
[45] Date of Patent: Aug. 17, 1993

[54] COMPUTER TRAVEL PLANNING SYSTEM

[76] Inventor: Brent J. Garback, 2285 Oak River Ct., Troy, Mich. 48098

[21] Appl. No.: 790,351

[22] Filed: Nov. 12, 1991

[51] Int. Cl.$^5$ ............................................. G06F 15/20
[52] U.S. Cl. ................................... 364/407; 364/407; 364/401
[58] Field of Search .................. 340/825.28; 364/407, 364/401

[56] References Cited

U.S. PATENT DOCUMENTS 4,862,357 8/1989 Ahlstrom et al. ..................... 364/407
4,922,439 5/1990 Greenblatt ............................ 364/407

FOREIGN PATENT DOCUMENTS 0108360 5/1987 Japan .
1180916 9/1985 U.S.S.R. .

OTHER PUBLICATIONS

"The TWA Reservation System", David Gifford, Comm. of the ACM, Jul. 1984, vol. 27, No. 7, pp. 650-665.

Primary Examiner—Gail O. Hayes
Attorney, Agent, or Firm—Krass & Young

[57] ABSTRACT

A computer based system for processing travel requests directed to a specific venue from individual members of a sponsored group. The system comprises a data base containing a venue file including information regarding the specific venue, a group member file for each individual member of the group, a travel policy file containing information on preselected vendors of various travel services, and a city code file containing codes corresponding to a plurality of city airport locations. Data is entered and information displayed to an individual group member making a travel request via a terminal, such as a personal computer. A central processing unit is in communication with the data base and with a plurality of airline CRS systems. The CPU is programmed to select an individual group member itinerary for the specific venue which includes specific airline flights, and if necessary, specific hotel accommodations and specific rental car services.

15 Claims, 6 Drawing Sheets

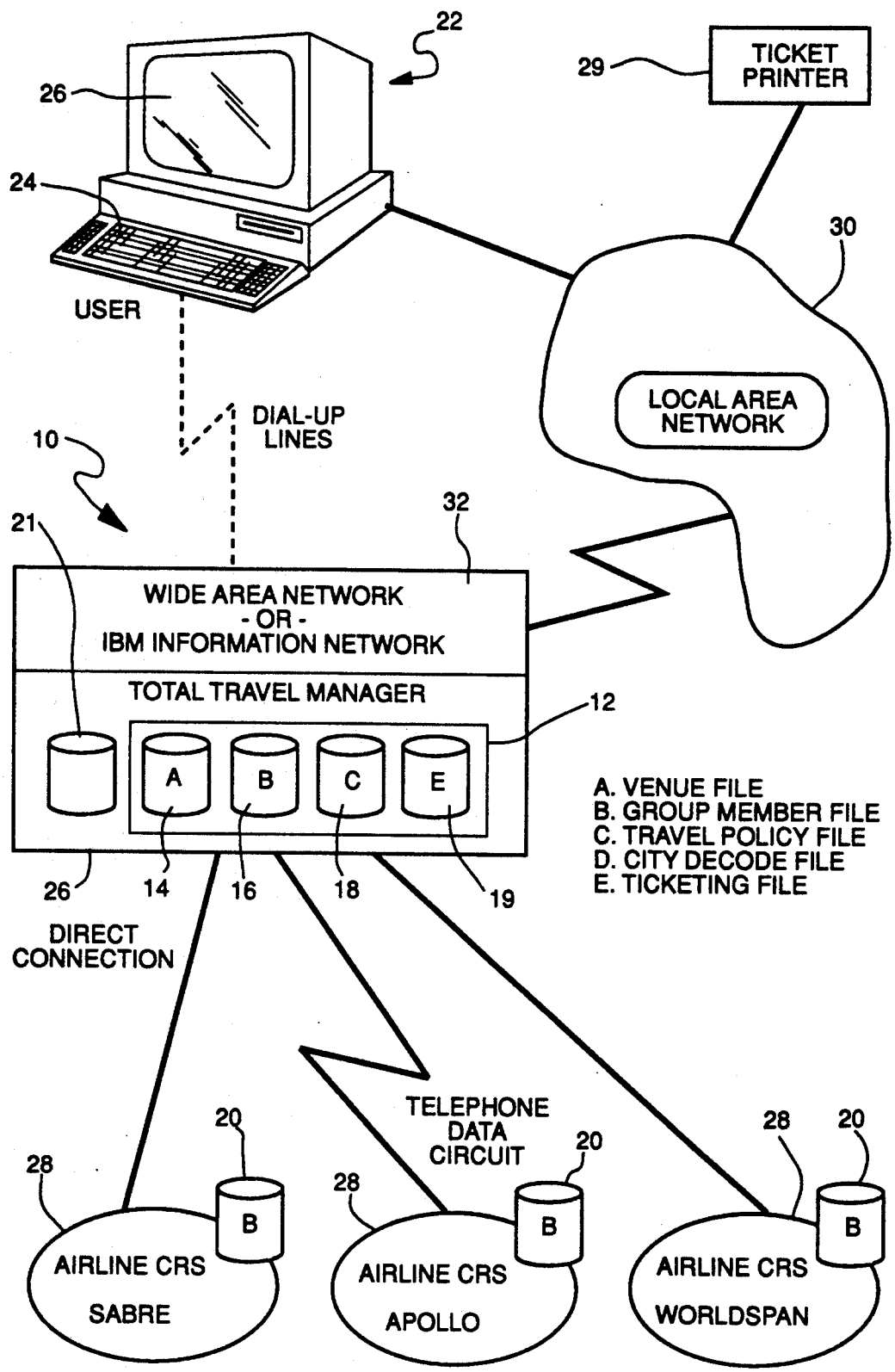

TOTAL TRAVEL MANAGEMENT, INC.

EMPLOYEE I.D. # ▭—72    MEETING CODE ▭—73

DEPARTURE CITY —74
DEPARTURE DATE —75
DEPARTURE TIME —76
DESTINATION CITY —77

RETURN DATE —78
RETURN TIME —79

HOTEL ▭—80    SPECIAL REQUESTS —82
CAR ▭—81    SPECIAL REQUESTS —83

TICKET DELIVERY DATE ▭—84

IS ALL THE ABOVE INFORMATION CORRECT (Y/N) ▭—85

<F1> HELP  <ESC> EXIT SYSTEM

```
                    TOTAL TRAVEL MANAGEMENT, INC.                    10/25/90

FLIGHT INFORMATION

EMPLOYEE I.D. # 382548888

FLIGHT 1 :   NW 50    FROM LAX  TO DTW   DEPARTING 12:20P   ARRIVING 01:00A
FLIGHT 2 :   NW 923   FROM DTW  TO LAX   DEPARTING 09:45A   ARRIVING 09:45P

TOTAL COST: $198.00    TICKET DELIVERY DATE: 11/1

HOTEL INFORMATION

NAME: HILTON-EAST    CONFIRMATION NUMBER: 782634801    RATE: $99.00

CAR INFORMATION

TYPE: AVIS MIDSIZE    CONFIRMATION NUMBER: 26302383USO  RATE: $36.00

IS ALL THE ABOVE INFORMATION CORRECT (Y / N) ☐

<F1> HELP  <ESC> EXIT SYSTEM
```

FIG - 4

COMPUTER TRAVEL PLANNING SYSTEM

FIELD OF THE INVENTION

This invention relates generally to the field of computerized travel planning and booking systems and, more particularly to such a system for processing travel requests directed to a specific travel venue from individual members of a sponsored group.

DESCRIPTION OF THE RELEVANT PRIOR ART

Presently, most business travel arrangements are handled via telephone connection to either a travel agency, an in-house travel department, or directly with a travel supplier such as an airline. For the individual business traveler, this can be a very time consuming and cumbersome process, and may require a number of telephone call-backs and verifications. Hence, attempts have been made to streamline this process. For example, the individual airlines have designed CRS (computerized reservation) systems which provide information on the availability on commercial airline flights in response to requests submitted from data terminals generally located in the travel agent's offices. By accessing the CRS systems, the travel agents may obtain information on the availability of space and book reservations on commercial airlines. Systems have been designed that allow the business traveler to interact directly with the CRS by using a personal computer. Typically, these prior art systems provide the business traveler with information concerning various flights, fares and rules surrounding a particular travel venue. However, since the traveler is left to sort through all of this information to make a cost effective decision, these prior art systems have proven to be more time consuming than transacting the business over the telephone. These prior art personal computer systems can take up to 20 minutes to use.

Some other attempts have been made to streamline the decision making process in determining business travel itineraries. For example, U.S. Pat. No. 4,862,357 discloses a computer reservation system including a remote data base containing flight schedule, fare and fare limitation information which is accessed from a local computer terminal. The information retrieved is sorted and scored in accordance with a predetermined travel policy stored in the local computer memory and as applied to a proposed travel itinerary. A ranked list of applicable flights is merged into a single display.

U.S. Pat. No. 5,021,953 discloses a travel planner system which automatically constructs itineraries with available seats for a traveler's trip request. The selected itinerary conforms to a pre-stored file of reasonableness standards. The system finds itinerary-with-fare combinations that are acceptable in terms of costs and convenience to the traveler and accord with the prestored reasonableness standards. The system displays the selected itineraries by departure or arrival time.

In many cases, the business traveler is a member of a group which is traveling to a specific venue. For example, the traveler may be attending a meeting, seminar or training program along with other individuals employed by the same corporation or other institution. In these cases, the sponsoring corporation or institution is generally expected to pick-up the costs of this business travel. However, many sponsoring organizations have little control over the specific travel itineraries selected by those attending the meeting. For example, the individual traveler may select one airline over another on the basis of a frequent flier membership with that airline, rather than making a cost effective decision. While businesses often have stated travel policies which require selection of the most cost effective itinerary, such travel policies prove difficult to enforce in a climate where each individual traveler is left to make his/her own arrangements.

Clearly, there is a need for a computer based travel planning system which allows an individual business travel to efficiently and effectively book an itinerary for a specified venue, such as an upcoming meeting or seminar. There is also a need for such a system which allows such a traveler to book in itinerary only if it conforms with a preset travel policy prenegotiated by the sponsoring organization.

SUMMARY OF THE INVENTION

Disclosed and claimed herein is a computer system by which an individual business traveler may book an itinerary, including airline flights, hotel reservations and, if necessary, ground transportation, for a specific venue in a process which takes only 30 to 40 seconds. Moreover, the itinerary so booked will automatically be in conformity with the fares prenegotiated by the sponsoring organization with various vendors. To accomplish this, the present invention provides a data base which contains a number of separate data files. One file, called a venue file, contains information about a specific venue for which a number of individual travelers from the same sponsoring organization are making travel arrangements. The venue file includes information such as the date on which the meeting or event begins, the date on which it ends, the city location of the meeting, and the address location of the meeting within the city. Obviously, in cases where the sponsoring organization is sponsoring travel to a number of venues, a separate venue file may be provided for each such venue.

The data base further includes a travel policy file which contains information on preselected airline carriers, preselected room accommodation providers, and preselected ground transportation providers. Normally, these vendors have been selected via negotiation with the sponsoring organization. Since the sponsoring organization can guarantee a certain number of travelers to the particular venue, it can usually negotiate group discounts on the airline flights, hotel rooms and car rental services. By negotiating with a plurality of vendors of each of these services, the group sponsor can obtain the most cost effective itinerary for that particular venue in terms of a specific airline carrier, hotel, and car rental company. The selections so made or all contained in the travel policy data file.

The data base of the present system further includes a city code data file which contains codes corresponding to a plurality of city airport locations. This file makes it possible for the system to interface between the individual travel requests entered into the system (which are expressed in terms of departure city and destination city) and the various airline CRS systems (wherein various airports are expressed in internationally recognized codes).

A group member data file is provided for each individual member of the sponsoring organization. The group member file contains personal preference information known about that group member, such as his/her preferences on airline seating, non-smoking arrangements, frequent flier membership, etc. The group member files may be included in the data base of the system of the present invention, or the system may access the various passenger files which presently exist in the several airline CRS systems.

A ticketing file may be provided which contains reservations that must be ticketed in the future. The system will check the ticket file on a daily basis, and produce and route tickets and/or itinerary notices to the proper destination.

A user communicates with the system of the present invention via a terminal, including means for entry of data corresponding to a particular group member's individual travel requests for a specific venue. The terminal may be provided as part of the present system, or the system may alternatively operate on existing equipment. Typically, the terminal may be a personal computer which is in communication with the system of the present invention via a local area network, a wide area network, or the sponsoring organization's own information network. The display unit of the personal computer allows the user to both see and verify the information on his/her individual travel request that has been entered, and also to view the individual travel itinerary constructed for him/her.

The system of the present invention also includes a central processing unit which is in communication with the data base and with the plurality of airline computerized reservation systems. The central processing unit is responsive to the individual travel request data entered on the terminal, and is programmed to emulate the decision making process of the typical corporate travel arranger. It retrieves information from the temporary individual travel request file, the specific venue file, the travel policy file including the prenegotiated vendors, and the group member file for the individual making the travel requests and, by accessing the flight schedules and other information contained in the various airline CRS systems, selects the optimum itinerary for that individual group member. The airline, hotel and group transportation selections are then booked and displayed on the user terminal. Thus, rather than leaving it to the individual traveler, travel agent, or corporate travel arranger to process the myriad of data and arrive at the most cost effective itinerary, the system automates that step of the process, and operates in a fraction of the time previously required to book a business reservation. Furthermore, it eliminates the possibility that the individual group member will circumvent the preferred travel vendors, thus significantly lowering the cost of corporate travel.

BRIEF DESCRIPTION OF THE DRAWINGS

The following detailed description may best be understood by reference to the following drawings in which:

FIG. 1 is a schematic view of a system in accordance with the present invention;

FIG. 3 illustrates an embodiment of a travel request screen generated by the system of the present invention; and FIG. 4 illustrates a typical itinerary display screen generated by the system of the present invention.

DETAILED DESCRIPTION OF THE PREFERRED EMBODIMENT

Figure 2A:
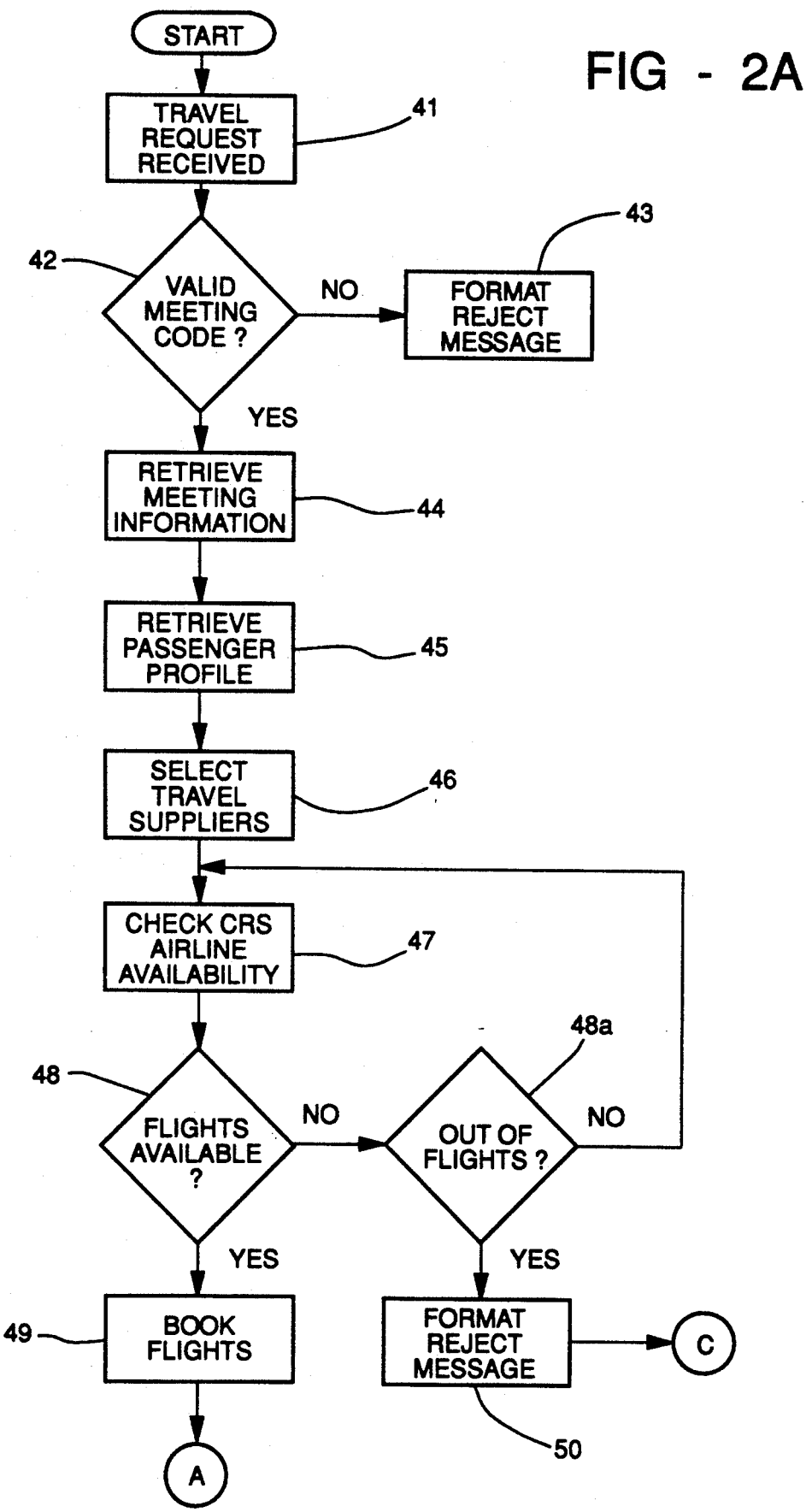
FIGS. 2a through 2e represent various ports of a logical flow diagram showing the overall operation of the present invention.

Throughout the following detailed description, like reference numerals are used to refer to the same element of the invention shown in multiple figures thereof. Referring now to the drawings, and in particular to FIG. 1, there is shown a computer based travel planning system 10 of the present invention which includes a data base 12 containing at least one venue file 14, a travel policy file 16, and a city decode file 18. The venue file 14 includes information regarding a particular travel venue for which a group of travelers sponsored by a particular organization will need travel arrangements. Typically, the venue will be a meeting, a seminar, a convention, a training program, etc. which a group of members of the sponsoring organization, such as a corporation, educational institution, non-profit foundation, etc., will be attending, with the sponsoring organization paying for the travel expenses incurred by the group members. However, the venue could be of another form, such as a subsidiary location or field location of a corporation, to and from which a significant number of corporate employees regularly travel. Since the cost effectiveness of the system of the present invention is realized largely through savings realized by negotiating group discounts with preselected vendors of airline, hotel and rental car services, any situation where enough members of the sponsoring organization must make travel arrangements to the same location may be denominated a venue for purposes of this invention. A venue file 14 for each such venue is located in the data base 12.

The travel policy file 16 includes information regarding the preselected vendors negotiated by the sponsoring organization. Typically, representative from the sponsoring organization will negotiate with various airline carriers, hotels, and rental car companies for group travel discounts for a specific venue. Those vendors making the lowest bids on these services will then be denominated preselected vendors, and will be included in the travel policy file 16. Thus, if an upcoming meeting is to be held in Rockefeller Center in New York City, beginning on September the 13th and ending on September the 16th, the travel policy file 16 will include one or more preselected airline carriers, covering travel from different parts of the country, to New York City on those dates. One or more hotel vendors will be designated as preselected, as will one or more car rental companies, if ground transportation is deemed necessary.

The city decode file 18 simply includes a list of internationally recognized codes for airports located in cities throughout the United States. The purpose of city decode file 18 is to permit departure and destination city information entered on travel request screen 71, (see FIG. 4) to be translated into the city codes recognized by the various airline CRS systems 28.

Individual group member files 20 are also provided which, in the embodiment shown in FIG. 1, are located within the data bases 28 of the individual airline CRS systems. However, it is contemplated that passenger files 20 could also be resident in data base 12.

A terminal 22 permits the individual group member to enter his/her travel requests on a data entry means, such as keyboard 24, and also to view travel information provided by the system of the present invention via a display means such as screen 26. Terminal 22 may be a dedicated terminal or it may be existing equipment.

Since terminal 22 includes both data entry means and display means, the individual group member can interactively interrogate the system. In one embodiment of the present invention, the terminal 22 comprises a personal computer with a modem and suitable communications software so that the individual group member may access the system 10 via telephone lines, either through a local area network 30, or, alternatively, through a wide area network 32 or an information network provided by the sponsoring organization. In this embodiment, the system may further include suitable software for the personal computer which initially, and independently of accessing the system 10 itself, can display a format screen 71, such as that illustrated in FIG. 4, with blanks to permit entry of various travel data, as will be explained subsequently in greater detail, and to store the data inputted in a temporary file which can be sent to the central system. However, in an alternative embodiment, these functions can also be performed by the central system 10, itself. The system 10 further includes a central processing unit 26 which is in communication with the data base 12, and is also in communication with a plurality of airline computerized reservation systems 78, such as the already existing Sabre, Apollo and Worldspan systems. The central processing unit 32 is responsive to the individual travel requests data entered on terminal 22 and is programmed to select an individual group member itinerary for a specific venue in response to an individual travel request from a group member. The individual group member itinerary includes, at a minimum, specific airline flights, and may also include specific hotel accommodations and specific ground transportation services. The central processing unit is further programmed to display the selected flights, hotel accommodations and ground transportation services to the individual group member via the display means of the terminal 22. Since the central processing unit is in communication with the various airline CRS systems, it also performs the function of booking the selected itinerary.

In a particularly preferred embodiment of the system of the present invention, the central processing unit is further programmed to make a price comparison between the negotiated fares available from the preselected vendors and any other airline flight for the same venue available from the airline CRS systems 28. In this embodiment, the system 10 initially selects an itinerary based on the negotiated fares from the preselected vendors contained in the travel policy file 18. An itinerary is then booked which relies on the preselected vendors. The system 10 then performs a price check by further interrogating the airline CRS systems 28 to discover whether there are any lower published fares available for the same venue. If lower fares are discovered, the system 10 cancels the original bookings and rebooks the itinerary by using the lower published fares.

In either embodiment, once a firm booking is made, a ticketing and delivery date is established. Actual printing and delivery of the ticket may be performed by the system of the present invention by incorporating into it a dedicated printer 29. However, these functions may be performed externally of the system.

As shown in FIG. 3, the individual group member initiates the process by filling out a screen 71 which will format an electronic travel request. The screen 71 includes an employee identification code window 72, an individual venue or meeting code window 73, departure and destination city windows 74, 77, departure and return date and time windows 75, 76, 78, 79, a hotel request window 80, a car rental request window 81, special request windows 82, 83, a ticket delivery date window 84 and a verification window 85. Additional pop-up menus (not illustrated) are available to assist the user with decoding city and airport names, and selecting preferred hotel and car vendors. When the user confirms that the information entered is correct via window 85, the travel request is formatted in a delimited file and sent to the central system 10.

FIGS. 2a-2d are flow charts which show the step by step operation of the system of the present invention. As shown in FIG. 2a, the initial travel request data is received in step 41 and is checked for a valid venue code in step 42. If an invalid venue code is encountered, an error message is formatted in step 43 and returned to the individual group member. If a valid venue code is encountered, the venue criteria with respect to dates, place, etc. is retrieved from the venue file 14 in step 44. To assist with the booking process, passenger information is retrieved from the group member file 20 in step 45, and information such as form of payment, or special service requests are moved into a shell reservation created on the airline CRS 28. Using the information retrieved from the venue file 14 and the group member file 20, the airline, hotel and ground transportation vendors are selected in step 46.

An airline availability request is formatted based upon the time and date of travel requested (the request can be based upon departure or arrival time) and the airline CRS 28 is interrogated in step 47. Once a response is received from the CRS 28, the response is read and the appropriate flights are selected. If the selected flights are available, the system moves to block 48, and a booking request is formatted and sent to the CRS 28 in step 49. If the flights are not available, the system 10 will continue to interrogate an airline CRS 28 until an available flight is located in step 48a. If available flights cannot be located an error message is formatted in step 50 and returned to the originator.

Figure 2B:
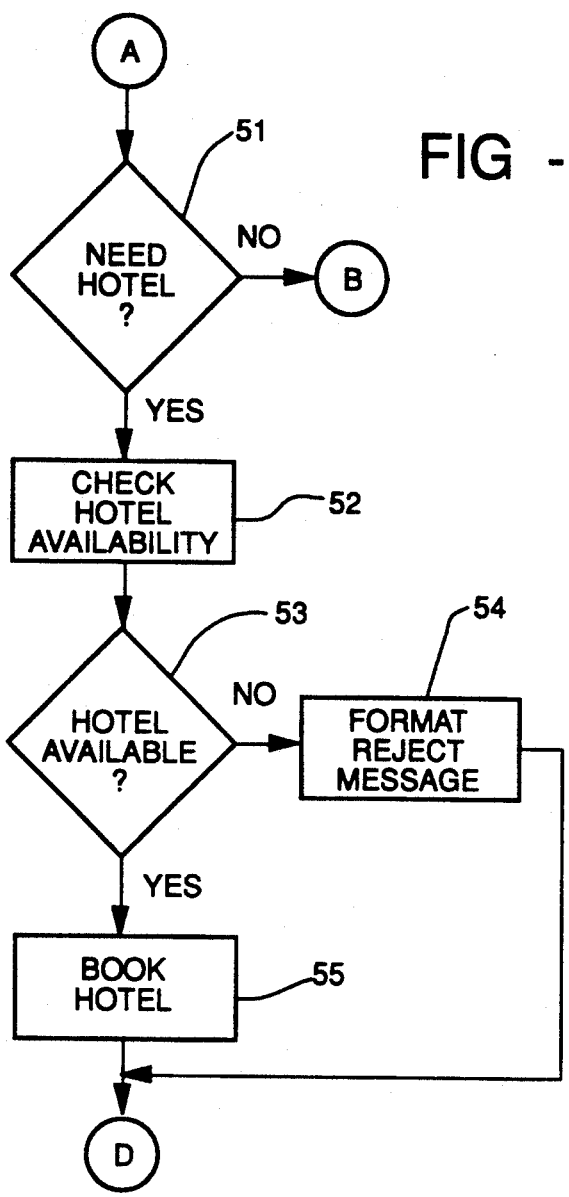

Once appropriate flights have been selected, a determination is made whether a hotel is required in step 51. If a hotel is not required, the hotel selection module shown in FIG. 2b is bypassed. If one is required, a hotel availability request is formatted in step 52 and sent to the CRS 28. Once a response is received from the CRS 28, it is read, and if the hotel is available, as block 53 indicates, a booking request is formatted in step 55 and sent to the CRS 28. If the hotel is not available, a reject message is formatted in step 54, and program control passes to the car booking module.

Figure 2C:
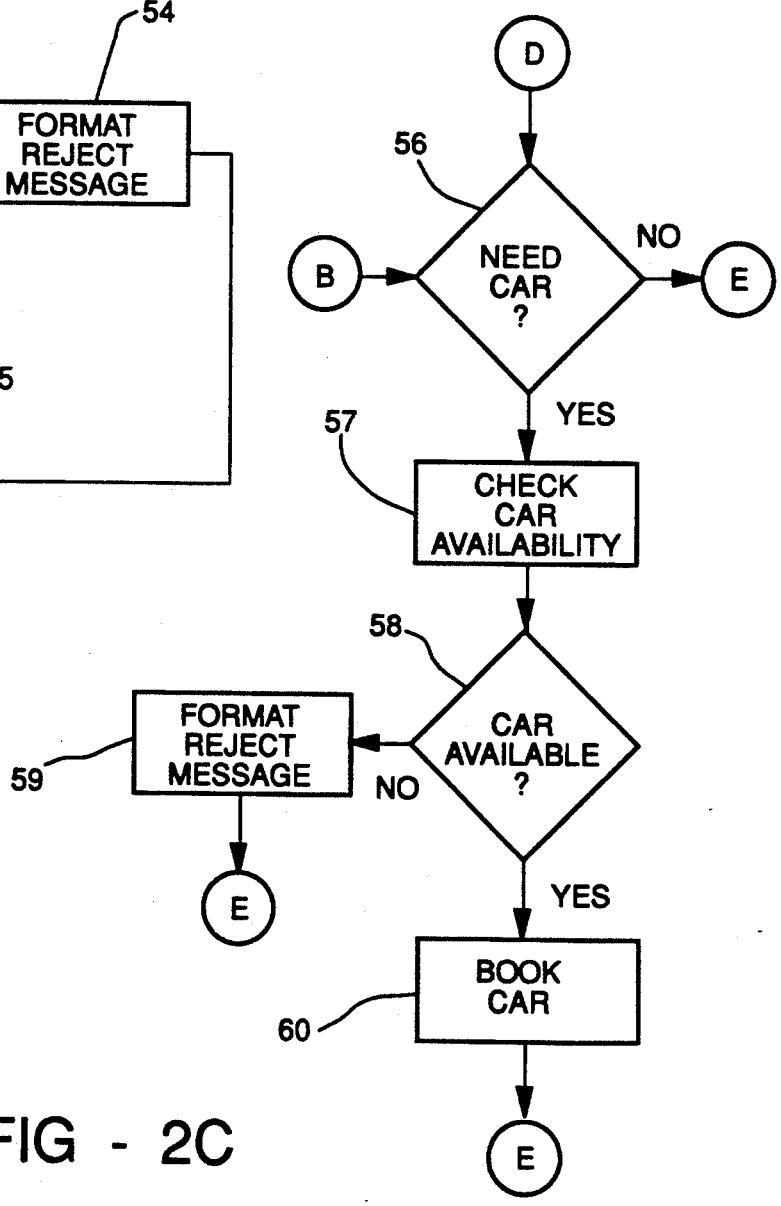
Figure 2D:
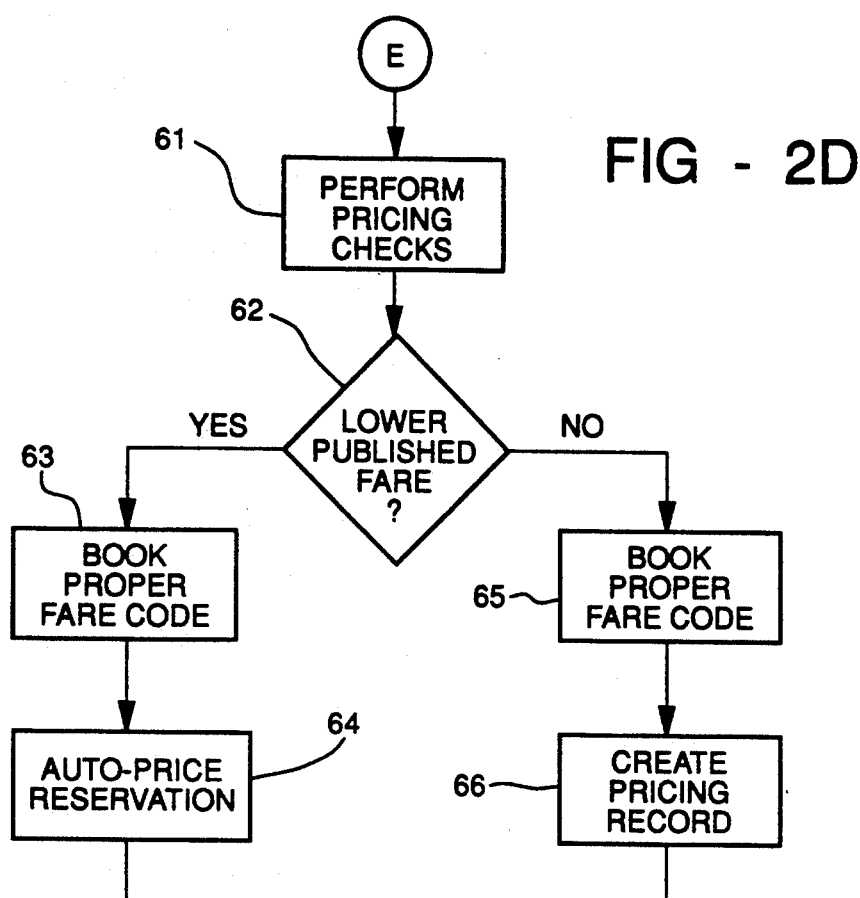

The car booking module is illustrated in FIG. 2c. If a car is required, as is indicated by block 56, a car availability request is formatted in step 57 and sent to the CRS 28. Once a response is received from the CRS 28, it is read, and if the car is available, as is indicated in block 58, a booking request is formatted and sent to the CRS 28 in step 60. If the car is not available, a reject message is formatted in step 59, and program control passes to the pricing module shown in FIG. 2d.

The travel policy file 18 and the various CRS 28 tariff displays are interrogated for applicable fares for the airline itinerary in step 61. If, in step 62, a published fare is located on a CRS 28 which is lower than the negotiated fare from the travel policy file 18, a cancel and rebook message is formatted and sent to the CRS 28 in step 63 for the applicable booking code for the fare. Once the confirmation response is received from the CRS 28, an auto pricing request is formatted and sent to the CRS 28 in step 64. If, on the other hand, a lower published fare is not located, a cancel and rebook message is formatted and sent to the CRS 28 for the applicable prenegotiated booking code in step 65. Once the confirmation response is received, a manual pricing record request is formatted and sent to the CRS 28 in step 66.

Based upon the travel request and the ticketing date for the fare, a ticketing and delivery date is established in step 67. A request is formatted for the CRS 28 to store the delivery information in the reservation. A seat assignment request is formatted and sent to the CRS in step 68.

A response message, such as is illustrated in FIG. 4, is formatted in step 69 to be returned to the individual group member traveler. The response message includes flight information, hotel information, car information, seat assignments and delivery information.

Figure 2E:
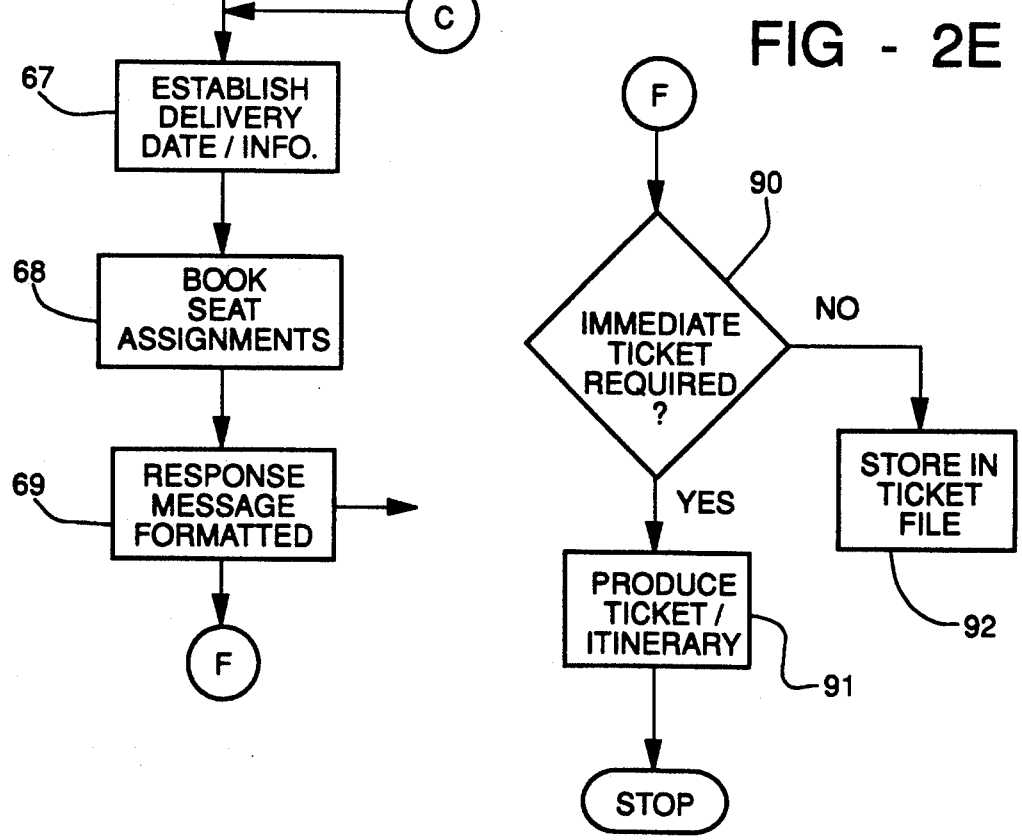

FIG. 2e illustrates the ticketing module of the present invention. If a ticket is required immediately (step 90), control passes to block 91 which routes a print ticket message to specially designated printer 29, generally located on the premises of the sponsoring organization. The print message enables printer 29 to print an airline ticket and an invoice/itinerary. If an immediate ticket is not required, control passes to block 92 which sends a confirmation message to the ticketing file 19. Ticketing file 19 holes the message until the day of ticketing. The CPU 32 is programmed to check ticketing file 19 daily for such messages.

The travel planning system of the present invention has been illustrated with reference to various embodiments and exemplifications thereof. By using the teachings of the present invention, doubtless one skilled in the art may be able to design other versions of the system which differ from those illustrated. However, the present invention is not intended to be limited by the embodiments and exemplifications illustrated and described. Rather, it is the claims appended thereto and all equivalents thereof which define the scope of the present invention.

I claim:

1. A system for processing a travel request directed to a specific venue from an individual member of a sponsored group having a plurality of members, said venue including at least a beginning date, an ending date, a city location and an address location within said city location, said system comprising:

a data base including:
      a venue file containing said beginning date, said ending date, said city location and said address location;
      a group member file for each individual member of said group containing information on personal airline seating preference, special meal requests, frequent flier information and request for non-smoking arrangements;
      a travel policy file containing information on negotiated fares on preselected airline carriers, preselected room accommodation providers, and preselected ground accommodating providers; and
      a city code file containing codes corresponding to a plurality of city airport locations;
   a terminal including:
      means for entry of data corresponding to said individual member's travel request for said specific venue and including the departure city of said group member, the departure date and time, the destination city, the return date and time, requests for hotel and requests for ground transportation; and
      means for displaying travel information regarding said specific venue; and
   a central processing unit in communication with said data base and a plurality of airline computerized reservation systems, and responsive to date entered on said terminal for:
      selecting an individual group member itinerary in accordance with said entered data for said specific venue including specific airline flights, specific hotel accommodations, and specific ground transportation;
      booking said member itinerary through one of said plurality of airline computerized reservation systems; and
      displaying said member itinerary on said terminal.

2. The system of claim 1 wherein said venue file further contains a code for said specific venue, said central processing unit being responsive to entry of said venue code on said terminal to allow said group member to access said system.

3. The system of claim 1 further comprising means for creating and displaying a travel request screen on said terminal to said individual group member for entry of said individual member's travel request data in a preselected format, storing said formatted data in a temporary file, and sending said temporary file to said central processing unit.

4. The system of claim 1 wherein the central processing unit is further programmed to:
   select a provisional airline flight itinerary in response to said individual member's travel request data and to information retrieved from said venue file and said travel policy file;
   interrogate said plurality of airline computerized reservation systems for applicable fares of airline flights comparable to the flights contained in said temporary airline itinerary;
   compare said applicable fares with said negotiated fares from said travel policy file;
   select the lower of said applicable fares and said negotiated fares; and
   book specific airline flights for said member itinerary based on said selected lower fare.

5. The system of claim 1 wherein the data base further includes a ticketing file for storing said individual group member itinerary, said central processing unit being further programmed to interrogate said ticketing file on a daily basis to determine if an airline ticket should be generated on a particular day.

6. The system of claim 1 further comprising a designated printer in communication with said central processing unit for printing an airline ticket and a printed itinerary in response to a ticketing message generated by said central processing unit.

7. A system for processing a travel request directed to a specific venue from an individual member of a sponsored group having a plurality of members, said venue including at least a beginning date, an ending date, a city location and an address location within said city location, said system comprising:
   a venue file containing said beginning date, said ending date, said city location and said address location;

a group member file for each individual member of said group containing information on personal airline seating preference, special meal requests, frequent flier information and request for non-smoking arrangements;

a travel policy file containing information on negotiated fares on preselected airline carriers, preselected room accommodation providers, and preselected ground accommodation providers;

a city code file containing codes corresponding to a plurality of city airport locations; and a central processing unit in communication with: said venue file; said group member file; said code file; said travel policy file; a terminal including means for entry of data corresponding to said individual member's travel request for said specific venue; and with a plurality of airline computerized reservation systems, and responsive to date entered on said terminal for:

selecting an individual group member itinerary in accordance with said entered data for said specific venue including specific airline flights, specific hotel accommodations, and specific ground transportation;

booking said member itinerary through one of said plurality of airline computerized reservation systems; and displaying said member itinerary on said terminal.

8. The system of claim 7 further comprising a data base containing said venue file, said travel policy file, and said city code file.

9. The system of claim 8 wherein said group member files are resident in the plurality of airline computerized reservation systems.

10. The system of claim 7 further comprising a data base containing said venue file, said group member files, said travel policy file, and said city code file.

11. The system of claim 7 wherein said venue file further contains a code for said specific venue, said central processing unit being responsive to entry of said venue code on said terminal to allow said group member to access said system.

12. The system of claim 7 further comprising means for creating and displaying a travel request screen on said terminal to said individual member for entry of said individual member's travel request data in a preselected format, storing said formatted data in a temporary file, and sending said temporary file to said central processing unit.

13. The system of claim 7 wherein the central processing unit is further programmed to select a provisional airline flight itinerary in response to said group members individual travel request data and to information retrieved from said venue file and said travel policy file, interrogating said plurality of airline computerized reservation systems for applicable fairs of airline flights comparable to said temporary airline itinerary, comparing said applicable fairs with said negotiated fairs from said travel policy file, selecting the lower of said applicable fairs and said negotiated fairs, and selecting specific airline flights for said individual group member itinerary based on said selected lower fair.

14. The system of claim 7 further comprising a ticketing file for storing said individual group member itinerary, said central processing unit being further programmed to interrogate said ticketing file on a daily basis to determine if an airline ticket should be generated on a particular day.

15. The system of claim 14 further comprising a designated printer in communication with said central processing unit for printing an airline ticket and a printed itinerary in response to a ticketing message generated by said central processing unit.

* * * * *

UNITED STATES PATENT AND TRADEMARK OFFICE
CERTIFICATE OF CORRECTION

PATENT NO. : 5,237,499
DATED : August 17, 1993
INVENTOR(S) : Brent J. Garback

It is certified that error appears in the above-indentified patent and that said Letters Patent is hereby corrected as shown below:

Column 3, Line 41, Please delete "group" (2nd Occurence) and insert -- ground --.

Column 7, Line 29, Please delete "holes" and insert --holds--.

Column 8, Line 9, Please delete "date" and insert -- data --.

Column 9, Line 18, Please delete "date" and insert -- data --.

Signed and Sealed this

Tenth Day of May, 1994

Attest:

BRUCE LEHMAN

Attesting Officer

Commissioner of Patents and Trademarks